INVENTOR
DONALD L. DICKINSON
BY
ATTORNEY.

Aug. 27, 1963  D. L. DICKINSON  3,101,872
ICE STORING AND DISPENSING MECHANISM FOR BEVERAGE
DISPENSING MACHINES AND THE LIKE
Filed June 24, 1960  4 Sheets-Sheet 3

INVENTOR
DONALD L. DICKINSON
BY
ATTORNEY.

Aug. 27, 1963

D. L. DICKINSON 3,101,872

ICE STORING AND DISPENSING MECHANISM FOR BEVERAGE
DISPENSING MACHINES AND THE LIKE

Filed June 24, 1960

INVENTOR
DONALD L. DICKINSON
BY
ATTORNEY.

United States Patent Office 3,101,872
Patented Aug. 27, 1963

3,101,872
ICE STORING AND DISPENSING MECHANISM FOR BEVERAGE DISPENSING MACHINES AND THE LIKE
Donald L. Dickinson, North Miami, Fla., assignor, by mesne assignments, to Continental Vending Machine Corp., a corporation of Indiana
Filed June 24, 1960, Ser. No. 38,558
2 Claims. (Cl. 222—197)

This invention relates to an ice storing and dispensing mechanism for use in beverage dispensing machines and adapted for other applications as well. For purposes of illustration and without limiting the scope of the invention except as it may be limited by the claims, the specification will deal solely with its application to a coin-actuated beverage dispensing machine. Reference is here made to a beverage dispensing machine which serves carbonated and non-carbonated soft drinks together with crushed or chipped ice.

Beverage dispensing machines of this general character are known. One such machine is disclosed in pending patent application Serial No. 755,575, filed by James J. Hill, on August 18, 1958. A storage and dispensing mechanism for crushed ice or ice chips is shown and claimed in said pending patent application. The present application discloses and claims an improved ice storing and dispensing mechanism.

It is the object of this invention to provide an ice storing and dispensing mechanism of the character described wherein an adequate supply of crushed or chipped ice is maintained at all times under optimum storage conditions and in which provision is made for dispensing substantially uniform charges of such ice in synchronization with the operation of the beverage dispensing mechanism proper.

Crushed or chipped ice is normally difficult to handle. The problem in beverage dispensing machines is to store such ice at just the right temperature so that the chips will not freeze together or melt down. In either case the ice would not be suitable for dispensing into a beverage. It is essential that the ice chips be prevented from adhering to each other and that they remain free to flow through the dispensing mechanism. It is important that the dispensing mechanism be capable of measuring uniform charges of such ice and positive ejecting means is required to insure dispensing the measured quantities at all lines. In this connection it will be understood that beverage dispensing machines may be operated at peak capacity at certain hours and perhaps not at all at other times. Despite such unequal demands upon the capacity of such machines, it is essential that they be ready at all times to dispense a full measure of crushed or chipped ice.

An important feature of the present invention resides in the provision of an insulated ice hopper or container and an elevated ice support within said hopper or container which insures the presence of a water drainage space below the ice. This feature renders it possible to keep the ice dry at all times and such melting as normally takes place would itself function to refrigerate the remaining ice. In short, this is a self-refrigerating feature which helps to keep the crushed ice in relatively dry dispensable condition. It will be seen in the drawing that draining of the melted ice is effected through a drainage system devoted expressly to this purpose, and not through the ice dispensing system as is normally the case.

Another important feature of the invention resides in the means for measuring predetermined quantities of crushed ice. This feature involves the use of a dispensing wheel which also serves as the ice supporting means last above mentioned. This dispensing wheel is formed with at least one, but preferably a plurality of ice-receiving and measuring cavities, each of predetermined size. The contents of such cavities constitute the measured quantities of ice which the machine dispenses. The problem of dispensing such measured quantities of ice is not alone solved by the provision of an ice-receiving cavity in a dispensing wheel. There remains the problem of filling such cavities with the same quantity of material at all times. In the present invention means is provided for intermittently elevating the dispensing wheel against the crushed ice which it supports in order to force the ice into the cavities. In other words, between discharge or dispensing operations, the dispensing wheel is pushed upwardly against or into the ice, thereby displacing some of it and causing it to enter and fill the cavities.

Still another important feature of the invention is the ice agitating means which helps maintain the ice chips in discrete, flowable condition. More specifically, the present invention provides a plurality of agitating arms, said arms being supported, preferably, in inclined positions and being adapted to move both angularly and axially about and along a vertical axis. The agitating arms are inclined at an acute angle relative to the vertical and by reason of their angular and vertical paths of movement they function most effectively to agitate the ice chips and maintain them in suitable condition for dispensing.

Still another important feature of the invention is the positive means for ejecting or discharging the ice chips from the dispensing wheel cavities. It is not enough that means for filling the cavities be provided; it is equally essential that adequate means be provided for discharging the cavities. Briefly stated, spring-urged means is provided for jarring the dispensing wheel in order to free its contents. This is accomplished by providing cam means for elevating the dispensing wheel and spring-urged means for forcibly thrusting it downwardly to an abrupt stop. This jars the dispensing wheel to the extent necessary to free and discharge its entire contents.

Also important in the present invention is the absence of solenoid discharge means such as are employed in other ice dispensing machines. The present invention relies, instead, on a dispensing wheel operated by a motor drive and this results in less stress on the machine, smaller current consumption, quieter and more trouble-free operation.

There are other important features in the invention which will be apparent from the detailed description thereof which is to follow:

Figure 1:
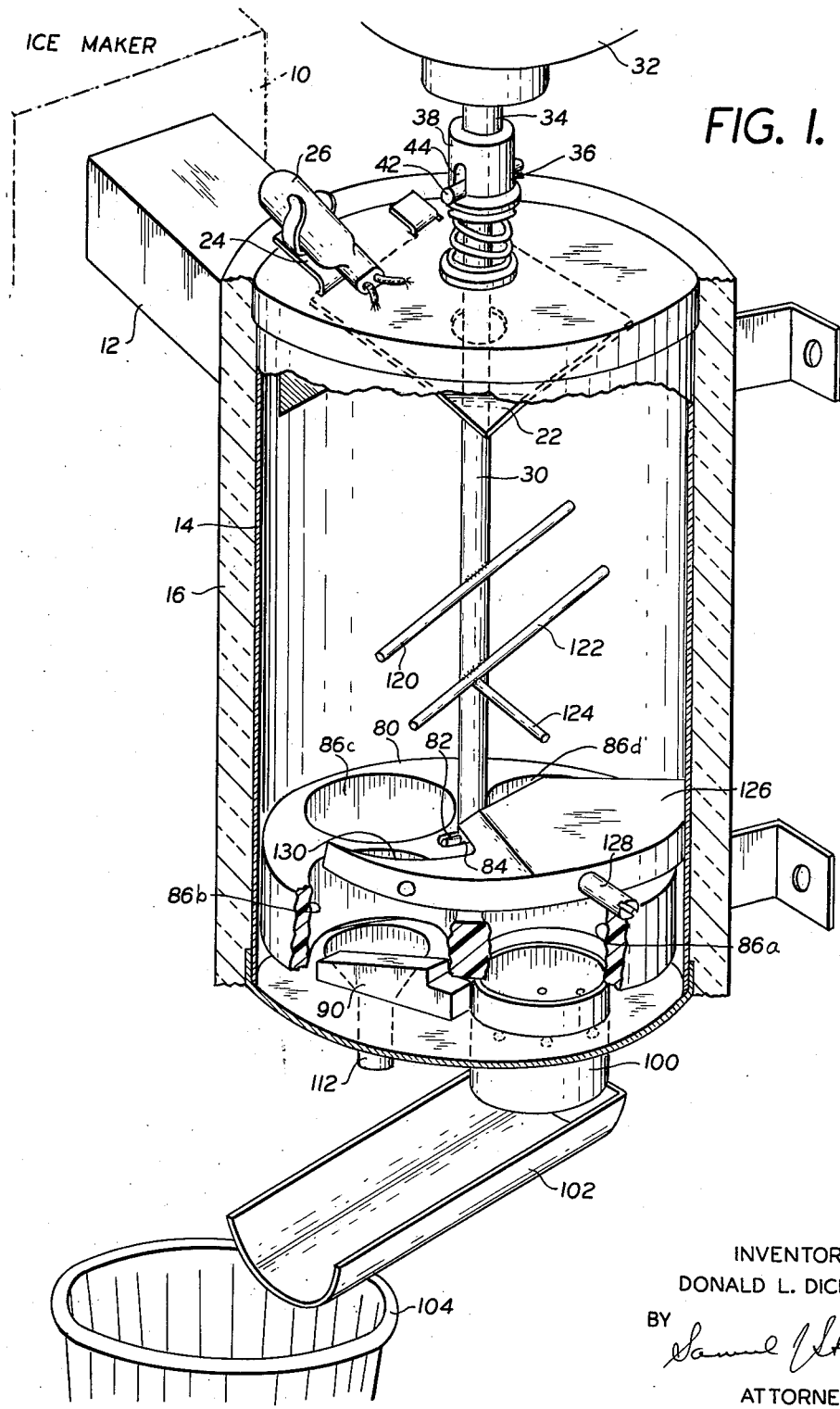
FIGURE 1 is a perspective view, partly broken away and in vertical section, of an ice storing and dispensing mechanism embodying the principles of this invention.

Referring now to the details of the invention as illustrated in the drawing, it will be observed that an ice-making mechanism 10 is provided which supplies crushed or chipped ice through a supply chute 12 to an ice storage container or hopper 14. Insulating material 16 covers the ice container or hopper in order to maintain its contents at a relatively low temperature. As the ice chips 20 feed into and fill the ice container or hopper, pressure will build up against a pivotally mounted switch flap or plate 22 connected by means of a bracket 24 to an ice cut-off switch 26. Any suitable conventional switch may be used for this purpose, such as a micro-switch or mercury switch. When said switch is actuated, it cuts off the flow of ice chips from the ice-maker 10, through the supply or feed chute 12 and into the container or hopper 14. After the ice chips are dispensed to the extent necessary to relieve the pressure on the switch flap or plate 22, said flap or plate will drop and the flow of ice chips into said ice container or hopper will resume.

It will now be seen that the ice container or hopper is preferably of generally cylindrical form, its longitudinal axis extending vertically. A drive shaft 30 extends downwardly through said container or hopper, centrally thereof, and it will be noted that said drive shaft is driven by an elevated electric motor 32. Since a very low angular speed is desired, the motor should preferably include or operate through a speed-reducing gear train.

The upper end of shaft 30 is connected to the motor shaft 34 by means of a slide coupling 36. More specifically, this coupling consists of a longitudinally slotted collar 38 which is fixedly secured to the motor shaft 34 by means of pin 40, and a crosspin 42 which is fixed to said shaft 30, said cross-pin engaging the slot 44 of collar 38. The vertical dimension of the slot exceeds the diametric dimension of the cross-pin, permitting said cross-pin to move vertically along said slot within the limitations imposed.

It will be observed that a second cross-pin 50 is affixed to shaft 30 a spaced distance below the first cross-pin 42. Abutting the lower end of collar 38 is a washer 52 and a second washer 54 rests against the second cross-pin 50. A coiled compression spring 56 encircles shaft 30 between said washers and bears against them with the following effect: Spring pressure is exerted through washer 54 and cross-pin 50 against shaft 30, urging said shaft axially downwardly to the position which it is shown to occupy in FIGURE 2. The shaft may be moved upwardly against the action of said spring and means is provided for intermittently achieving this result, as will shortly appear.

Figure 2:
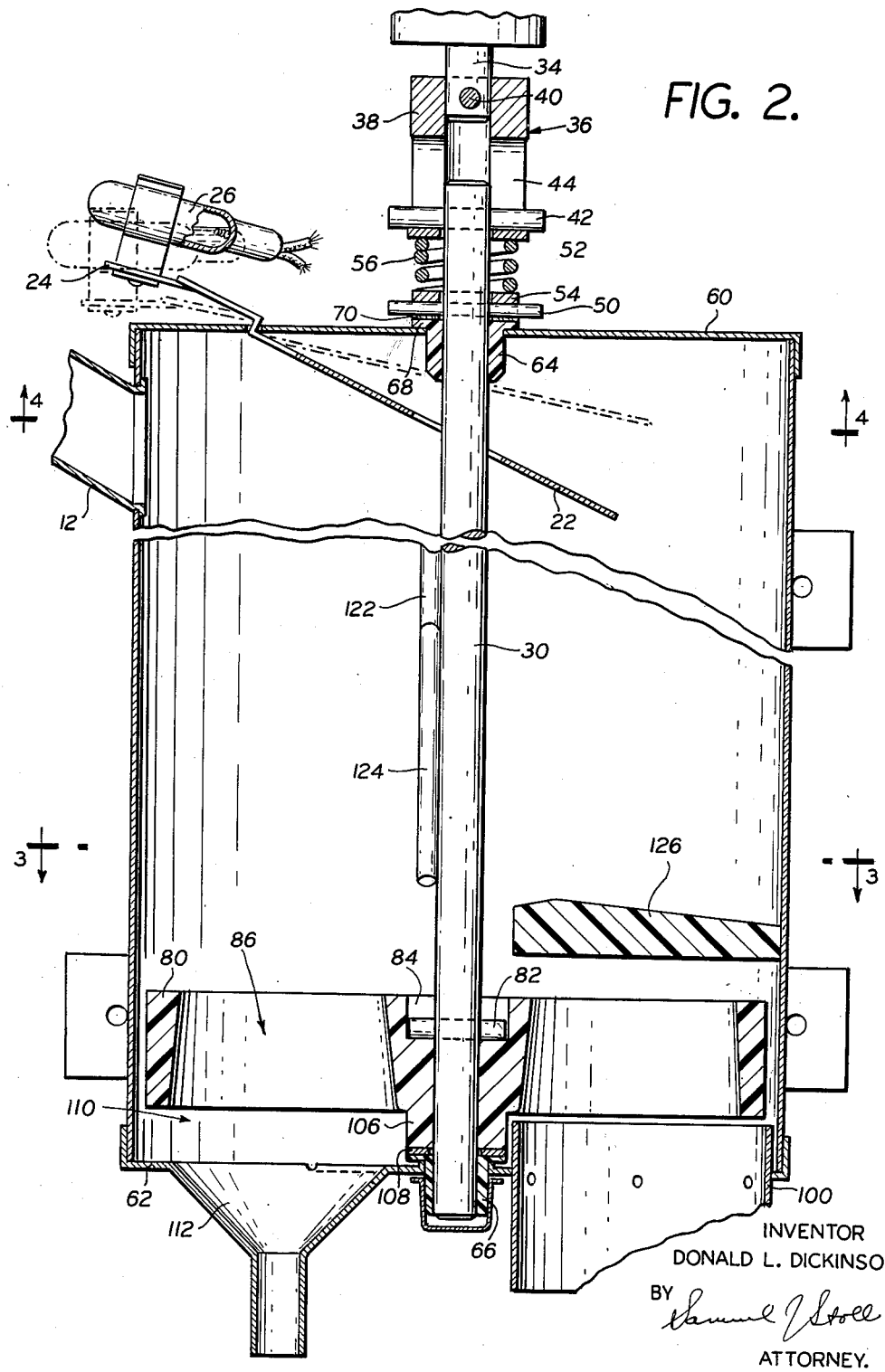
FIGURE 2 is an enlarged, fragmentary, vertical section through said ice storing and dispensing mechanism, said section being taken on the line 2—2 of FIGURE 3.

Referring once again to shaft 30, it will be seen in FIGURE 2 that said shaft projects through upper and lower walls 60 and 62 of the ice hopper or container. A bearing 64 is provided in upper wall 60, centrally thereof, in order to receive the upper end of shaft 30 and another bearing 66 is provided in the lower wall 62, also centrally thereof, in order to receive the lower end of said shaft. These two bearings support the shaft along the longitudinal axis of the ice hopper or container and permit the shaft to engage in angular movement about said longitudinal axis as well as in axial movement in either direction along said axis. It will be observed that upper bearing 64 is provided with a radially outwardly extending flange 68 which abuts the upper wall 60 of the ice hopper or container. Resting against said flange 68 is a washer 70 which the lower cross-pin 50 is adapted to engage. It will therefore be understood that cross-pin 50 serves as a stop pin against washer 70 in order to limit downward movement of shaft 30 under the influence of spring 56.

Figure 3:
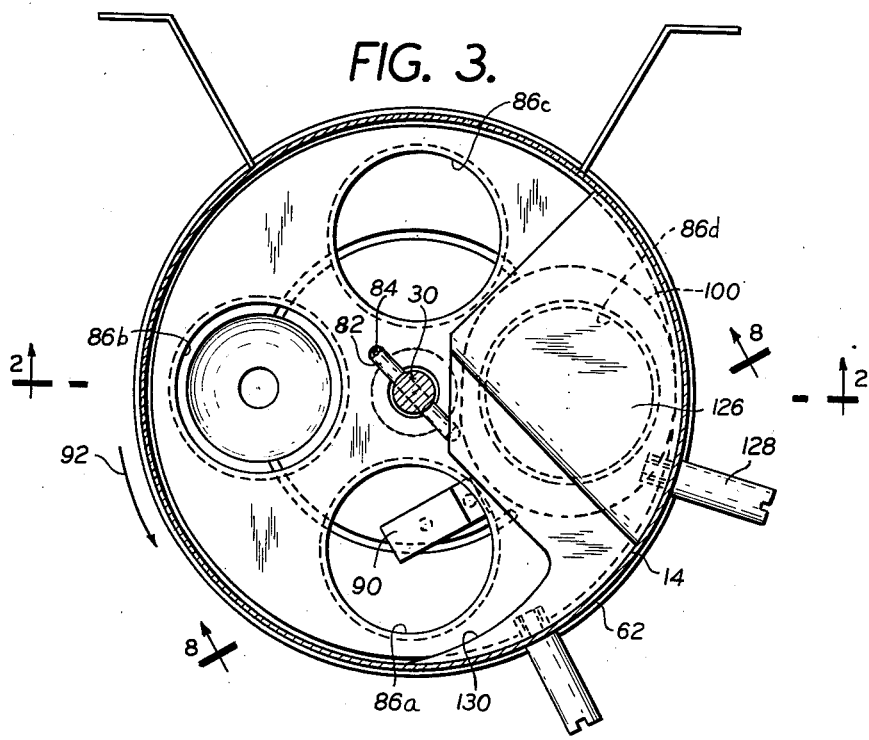
FIGURE 3 is a horizontal section taken on the line 3—3 of FIGURE 2.
Figure 4:
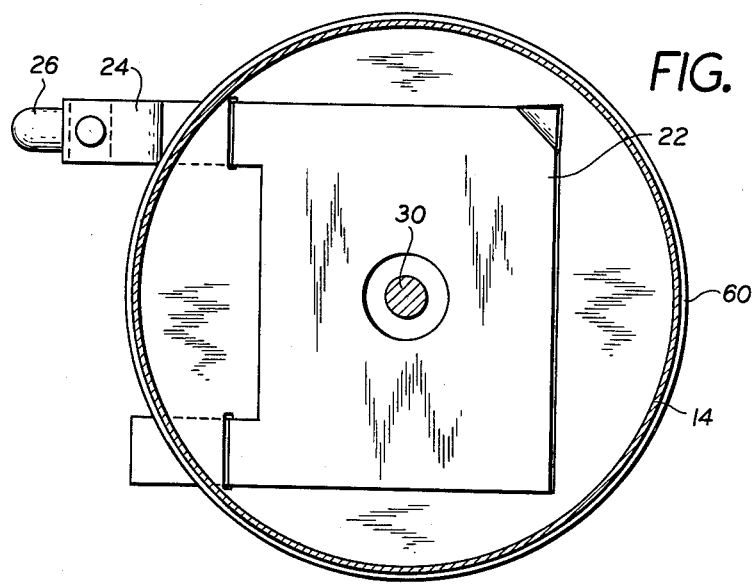
FIGURE 4 is another horizontal section taken on the line 4—4 of FIGURE 2.

Mounted on the lower end of shaft 30, above bearing 66, is a dispensing or carrier wheel 80. A cross-pin 82, fixed to shaft 30, is seated in a groove 84 formed in the hub of said dispensing wheel. This arrangement fixes the shaft to the dispensing wheel for integral angular movement thereof. The dispensing wheel is but slightly smaller in outer diameter than the inner diameter of the ice hopper or container. It is provided with a plurality of ice-receiving cavities 86 arranged equidistant from the central axis of the wheel and in uniformly spaced relationship to each other. Each of said cavities describes a truncated cone having a vertical axis, the smaller end serving as the inlet and being disposed at the top, the larger end serving as the outlet and being disposed at the bottom, and both ends being open. It is this conical cavity shape, tapering from relatively small proportions at the top to relatively large proportions at the bottom, which facilitates discharge of the ice contents. In the preferred form of this invention, there are four such cavities, as shown in FIGURE 3, but this will be understood as being illustrative rather than limitative of the invention. A larger or smaller number of cavities may be used to equal advantage, and even a single cavity will suffice in certain installations. The size of the cavity determines the size or quantity of the ice charge.

Figure 5:
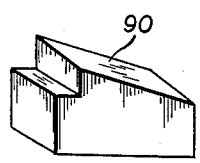
FIGURE 5 is a perspective view of a cam element which elevates the dispensing wheel.
Figure 6:
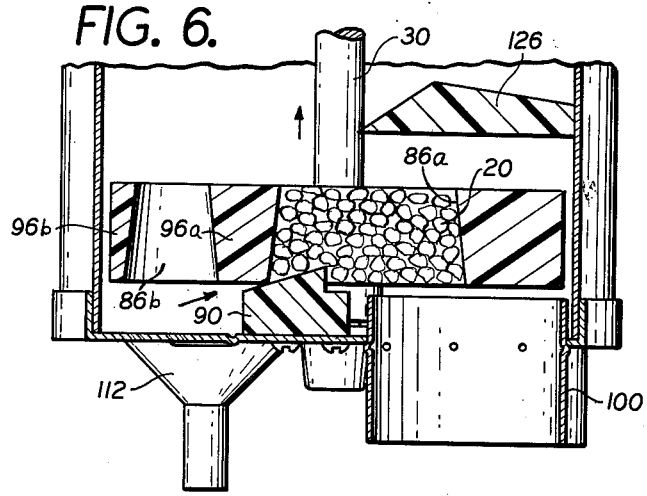
FIGURE 6 is a fragmentary, vertical section through the dispensing means of the machine, showing the dispensing wheel riding up on the cam illustrated in FIGURE 5 and thereby filling its cavities with ice.
Figure 7:
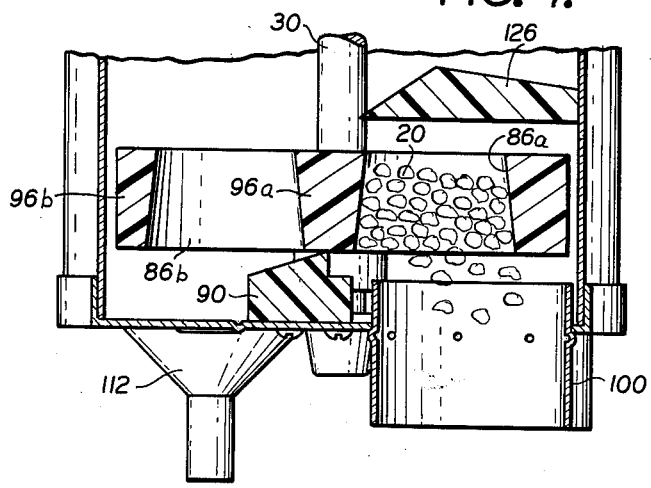
FIGURE 7 is a view similar to that of FIGURE 6 but showing the dispensing wheel in its uppermost position on said cam and bringing one of its ice-filled cavities into registration with the ice ejecting or discharging tube.
Figure 8:
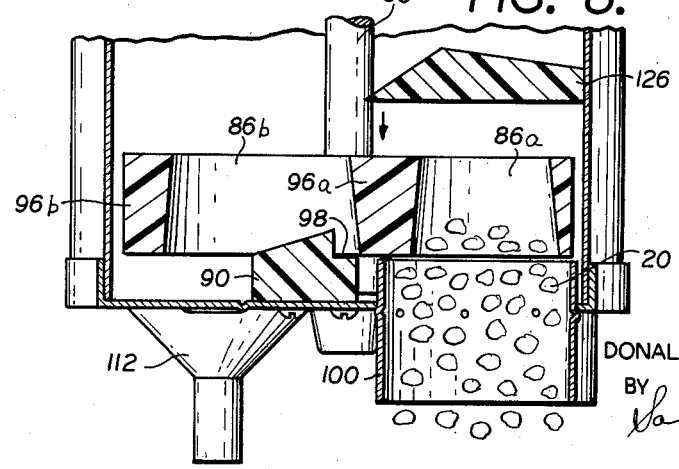
FIGURE 8 is another similar view showing the dispensing wheel in its lowermost position after dropping off the cam, its last mentioned cavity being in registration with said ejecting tube, its contents discharging there-from by momentum resulting from the jarring action on the dispensing wheel, as will hereinafter more fully be described.

Mounted on the bottom wall 62 of the ice hopper or container is a jogging cam 90 which is best shown in FIGURE 5 of the drawing. This cam provides an inclined ramp or cam face which is positioned for engagement with the webs which separate the cavities of the dispensing wheel. When the machine is in operation, shaft 30 causes the dispensing wheel to rotate in 90 degree increments in counterclockwise direction as viewed in FIGURE 3 and as indicated by curved arrow 92. Assuming a starting position in which the jogging cam is positioned in registration with cavity 86a, rotation of the dispensing wheel will cause its web portion 96a to ride up on the inclined face of jogging cam 90, as shown in FIGURE 6, until the very top edge or crest of said cam is reached, as shown in FIGURE 7. It will, of course, be understood that this upward movement of the dispensing wheel takes place against the action of spring 56 above mentioned. Said dispensing wheel, pushing upwardly against cross-pin 82 of shaft 30, and cross-pin 50 of said shaft bearing upwardly against said spring, the spring is thereby loaded. Further angular movement of the dispensing wheel will bring its web 96a past the crest of the jogging cam and the loaded spring will now thrust shaft 30 downwardly together with the dispensing wheel until said web 96a strikes shoulder or ledge 98 of the jogging cam. See FIGURE 8. By this time cavity 86a will register with a discharge opening in the bottom wall of the ice hopper or container and with a dispensing tube 100. The shock of the sudden impact of the web 96a against ledge or shoulder 98 will jar the dispensing wheel and shake loose the ice contents of cavity 86a, thereby dislodging and discharging such contents into said dispensing tube 100. The ice is thereby caused to drop upon sloping chute 102 which funnels it into a beverage cup 104, shown in FIGURE 1 of the drawing. The beverage is also discharged into said cup, by synchronized means not herein shown or claimed, and the dispensing operation is terminated.

Jogging cam 90 is now disposed in registration with cavity 86b of the dispensing wheel. Further operation of the machine will bring web 96b of said dispensing wheel into engagement with the jogging cam 90 and the dispensing wheel will once again ride up said cam to its elevated position, shown in FIGURE 7. Continued angular movement of the dispensing wheel will cause its web 96b to disengage the top edge of the jogging cam and the wheel will once again drop to dislodge the ice contents of cavity 86b and to discharge such contents into the discharge tube 100. The process will continue with respect to cavities 86c and 86d and then the cycle will be repeated, beginning with cavity 86a.

It will be observed that the discharge tube 100 extends upwardly a predetermined distance through the opening in the bottom wall of the ice hopper or container. As is shown in FIGURE 2, hub 106 of the dispensing wheel projects downwardly from the main body of the wheel for engagement with washer 108 on bearing 66. This supports the main body of the dispensing wheel a spaced distance above the bottom wall 62 of the ice hopper or container and thereby enables the dispensing wheel to clear the upper end of said discharge tube 100. A space 110 is thereby provided between the bottom wall 62 of the ice hopper or container and the dispensing wheel, even when the latter is in its lowermost position shown in FIGURE 2. Communicating with space 110 is a funnel-shaped drain 112 which is supported by the bottom wall of the ice hopper or container. Melted ice and slush may accumulate in space 110 and eventually will be carried off through drain 112. It will be noted in FIGURE 1 that said drain 112 is offset both from chute 102 and beverage cup 104 so that there will be no danger of the melted ice entering said cup during a beverage dispensing operation.

In order to keep the crushed or chipped ice in discrete, flowable particles it is necessary to agitate and channel the ice as follows: Secured to shaft 30 is a plurality of angular bars 120, 122 and 124, respectively. Bars 120 and 122 are disposed in substantially parallel relation to each other at an angle of approximately 45 degrees relative to the longitudinal axis of shaft 30. Bar 124 is disposed at an angle of approximately 90 degrees with respect to bar 122 and at an angle of approximately 45 degrees to said longitudinal axis. This is an illustrative arrangement and it will be understood that other angular relationships will also suffice for the purposes of this invention. It is sufficient that bars 120, 122 and 124 be so positioned and oriented on shaft 30 that, when the shaft rotates, the bars will agitate or stir the ice contents of the hopper or container to the extent necessary to maintain the ice particles in free, discrete, flowable condition. In this connection it should be remembered that shaft 30 engages in axial movement as well. Consequently, these agitator arms will also move vertically while moving angularly to ensure satisfactory agitation and distribution of the ice particles.

An ice scraper 126 is secured to the inner wall of the ice hopper or container by means of screws 128. Said scraper is provided with a generally arcuate, beveled scraping edge 130, which tends to cut and channel the crushed or chipped ice radially inwardly from the hopper wall. This prevents the ice from collecting on and encrusting the container wall. The scraper is shown to be positioned above discharge tube 100 and in this connection functions as a baffle to help prevent premature discharge of the ice through said discharge tube.

The materials of which the foregoing mechanism may be made will, of course, be dictated by many considerations. For example, sanitary requirements render it desirable that all metal parts in contact with the ice be made of stainless steel or other non-corrosive rust-proof alloys approved or sanctioned by the health authorities. Non-metal parts, such as dispensing wheel 80, bearings 64 and 66 and scraper 126, may be made of molded plastics. For example, the bearings may be made of molded nylon or Teflon or any other plastic material suitable for bearing use. The dispensing wheel 80 and scraper 126 may be molded of thermosetting plastics such as Bakelite but it will be also understood that many thermoplastic compounds may be used to good advantage.

The foregoing illustrates a preferred form of the invention and as has above been indicated this preferred form may be modified and other forms may be provided within the broad spirit of the invention and the broad scope of the claims.

I claim:

1. A dispenser for crushed and chipped ice and the like, comprising an ice container, a horizontally disposed dispensing wheel mounted therein for both rotary and axial movement on a vertical axis, spring means acting upon said dispensing wheel to urge it axially downwardly, a plurality of vertically extending ice measuring cavities formed in said dispensing wheel, said cavities being conically shaped, their upper ends being relatively small and open to receive ice from the ice container, their lower ends being relatively large and open to discharge said ice, web elements formed between said cavities, a discharge opening formed in said ice container below said dispensing wheel, a cam element mounted in said container immediately below said dispensing wheel, means for intermittently rotating the dispensing wheel to register said cavities sequentially with said discharge opening and causing intermittent engagement of said cam means with said web elements, whereby the web elements are caused to ride up upon said cam means to axially raise the dispensing wheel against the spring means and against the ice contents of said container in order to fill the cavity with ice, said dispensing wheel being thrust downwardly by said spring means when the web elements clear the cam means, said cam means, cavities and discharge opening being so oriented that one of said cavities registers with said discharge opening at the time one of said web elements clears the cam means, and stop means being provided below said dispensing wheel to abruptly arrest its downward movement under the influence of said spring means in order to jar the dispensing wheel and dislodge the ice contents of said registering cavity and thereby to drop said contents through said discharge opening.

2. A dispenser for crushed and chipped ice and the like, comprising an ice container, an ice agitator mounted in said ice container for both rotary and axial movement therein, means for intermittently rotating said ice agitator for axially moving it in alternately opposite directions, a horizontally disposed dispensing wheel mounted in said ice container, spring means acting upon said dispensing wheel to urge it axially downwardly, a plurality of vertically extending ice measuring cavities formed in said dispensing wheel, said cavities being conically shaped, their upper ends being relatively small and open to receive ice from the ice container, their lower ends being relatively large and open to discharge said ice, web elements formed between said cavities, a discharge opening formed in said ice container below said dispensing wheel, a cam element mounted in said container immediately below said dispensing wheel, means for intermittently rotating the dispensing wheel to register said cavities sequentially with said discharge opening and causing intermittent engagement of said cam means with said web elements, whereby the web elements are caused to ride up upon said cam means to axially raise the dispensing wheel against the spring means and against the ice contents of said container in order to fill the cavity with ice, said dispensing wheel being thrust downwardly by said spring means when the web elements clear the cam means, said cam means, cavities and discharge opening being so oriented that one of said cavities registers with said discharge opening at the time one of said web elements clears the cam means, and stop means being provided below said dispensing wheel to abruptly arrest its downward movement under the influence of said spring means in order to jar the dispensing wheel and dislodge the ice contents of said registering cavity and thereby to drop said contents through said discharge opening.

References Cited in the file of this patent

UNITED STATES PATENTS

| | | |
|---|---|---|
| 832,022 | Meyer | Sept. 25, 1906 |
| 2,366,379 | Bemis | Jan. 2, 1945 |
| 2,415,528 | Peebles et al. | Feb. 11, 1947 |
| 2,801,774 | Harkness et al. | Aug. 6, 1957 |